June 19, 1962 D. J. BOBENMYER 3,039,157
MOLD ASSEMBLY AND ALINING DEVICE
Filed Oct. 6, 1960 3 Sheets-Sheet 1

INVENTOR
David J. Bobenmyer
BY
Wilkinson, MawKinney & Theibault
ATTORNEY

INVENTOR
David J. Bobenmyer

June 19, 1962  D. J. BOBENMYER  3,039,157
MOLD ASSEMBLY AND ALINING DEVICE
Filed Oct. 6, 1960  3 Sheets-Sheet 3

INVENTOR
David J. Bobenmyer
BY
Wilkinson, Mawhinney & Theibault
ATTORNEY

United States Patent Office 3,039,157
Patented June 19, 1962

3,039,157
MOLD ASSEMBLY AND ALINING DEVICE
David J. Bobenmyer, 1482 Terrawenda Drive,
Defiance, Ohio
Filed Oct. 6, 1960, Ser. No. 60,980
8 Claims. (Cl. 22—31)

The present invention relates to mold assembly and alining device, and has for an object to provide means for leveling the meeting surfaces of cope and drag flasks and for alining the same to correct molding position as the cope is lowered upon the drag flask.

Another object of the invention is to achieve the foregoing results by the conjoint use of leveling shafts and locating pins carried respectively by the guide and hook frames and operable incident to the relative movement of these frames as occasioned by lowering of the bail assembly.

A further object of the invention is to provide a novel form of locating pin contoured externally to fit openings or bushings in the two flasks in a novel mode of operation relatively to the cope flask bushing and the drag flask pin.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
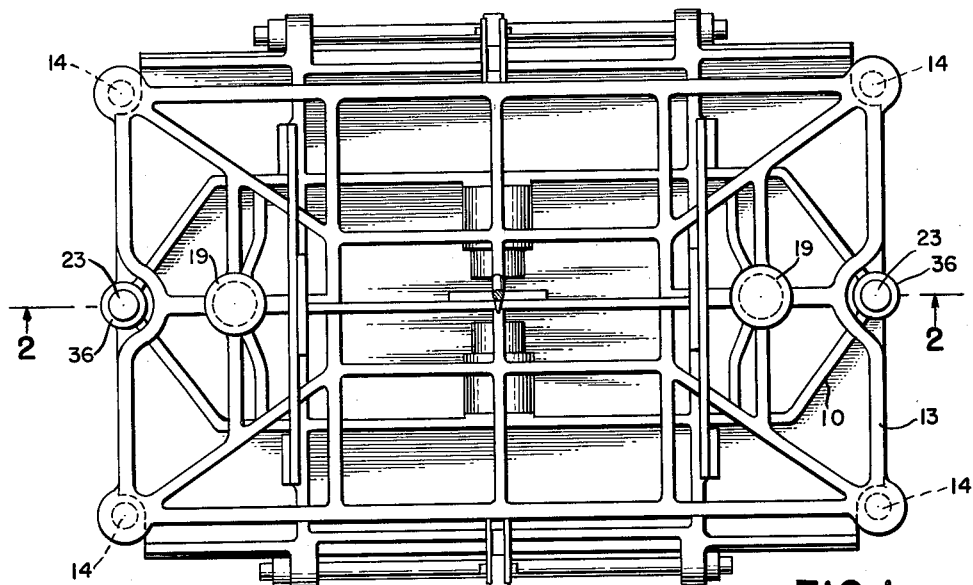
FIGURE 1 is a top plan view of a mold assembly and alining device constructed in accordance with the present invention.

Referring more particularly to the drawings, 10 designates the hook frame having the pivoted and swinging hooks 11 for cooperating in a usual manner with appropriate parts of the cope flask 12, and 13 represents the guide frame which is movable relatively to the hook frame 10 and carries the downwardly depending leveling shafts 14.

The hook frame is supported by the bail assembly 15 having an eye 16 for engagement by a hook 17 from the air hoist.

Figure 2:
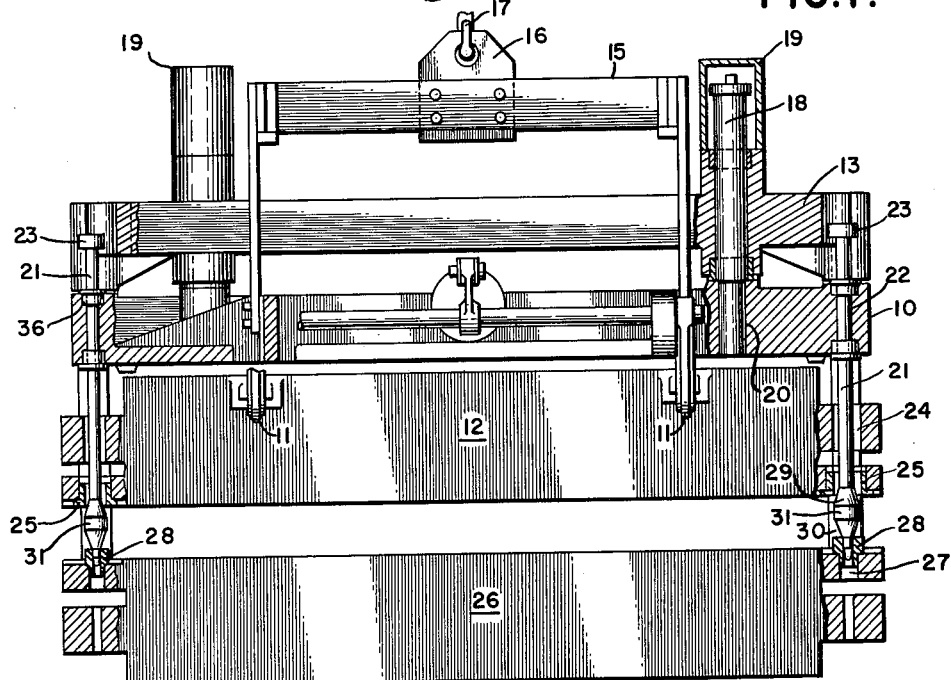
FIGURE 2 is a longitudinal central section taken on the line 2—2 in FIGURE 1.

In FIGURE 2, 18 represents the guide shafts carried on the guide frame 13 within dust caps 19, such guide shafts extending into openings 20 of the hook frame 10.

The locating pins 21 are two or more in number carried at the central end portions of the hook frame 10, the same being mounted loosely through openings 22 of the hook frame and having heads 23 at their upper ends of greater diameter than the diameter of the pins in order that such heads 23 may rest freely on the upper ends of the hook frame 10. In other words the locating pins 21 are floatingly mounted to the hook frame 10.

The cope flask 12 has openings 24 vertically therethrough in alinement with the pins 21, such openings being substantially superior in diameter to the diameter of the pins 21. The lower ends of such openings 24 are fitted with cope flask bushings 25 also having an internal diameter greater than the diameter of the pins 21.

Figures 6, 7:
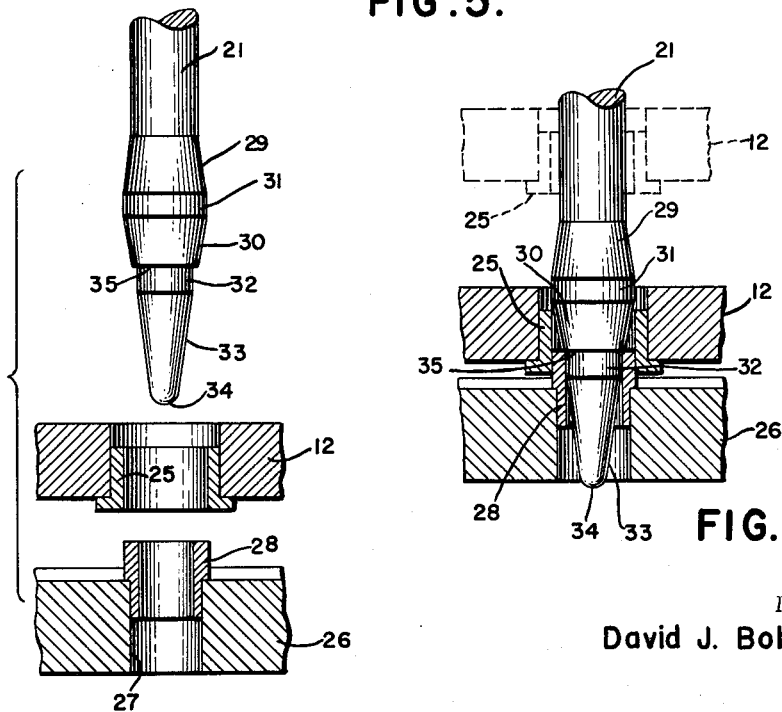
FIGURE 6 shows one of the locating pins partly broken away poised above openings in the cope and drag flasks, which latter being illustrated as broken away and in section and separated.
FIGURE 7 is a similar view showing the locating pin in final position with the flasks approaching the parting line and showing in dotted lines an upper position of the cope flask.

Referring more particularly to FIGURES 6 and 7, the drag flask is represented at 26 and it is provided with openings 27 positioned to receive lower end portions of the locating pins 21. Such openings 27 are equipped with hollow or cylindrical drag flask pins or bushings 28 having an outside diameter slightly less than the inside diameter of the bushings 25 whereby the bushings may be received over the drag flask pins, as shown in FIGURE 7. The internal diameter of the drag flask pins 28 is somewhat less than the diameter of the locating pins 21.

Lower projecting end portions of the locating pins 21 are formed with frusto-conical sections 29 and 30 which are relatively inverted and disposed at opposite sides of a cylindrical section 31 which is of greater diameter than the diameter of the pins 21. The conic section 29 is upright and flares out in a downward direction. The lower conic section 30 tapers downwardly. Below the conic section and stepped downwardly therefrom is a smaller cylindrical section 32 having a diameter less than the diameter of all of the sections of the pin 21 thereabove. Below the smaller cylindrical section 32 is a downwardly tapering cone 33 terminating in a lower rounded nose 34.

The diameter of the larger cylindrical section 31 is substantially that of the internal diameter of the bushing 25. The diameter of the smaller cylindrical section 32 is substantially that of the internal diameter of the drag flask pin 28.

Between the lower conic section 30 and the smaller cylindrical section 32 is an outstanding shoulder 35 shown to rest upon the upper end of the drag flask pin 28 in the lowermost position of the locating pin 21, thus limiting any further downward movement of the pin 21.

The two pins 21 are of the same design but of different diameters, the flask having different diameter bushings at each end to prevent accidental reversal of pattern components.

In the use of the device the cylindrical sections 31 and 32 are coaxial or concentric and are the pilots or locators in joining the bushings 25 and the drag flask pins 28. Let us assume that the lower nose 34 has passed through bushing 25 and shoulder 35 is seated on bushing or drag flask pin 28, stopping the downward motion of the pins 21.

Now bushing 25 in the cope flask 12 must make its descent downward about the enlarged cylindrical section 31 of the pin 21. The external diameter of this larger cylindrical section 31 will be approximately ⅛ of an inch less than the internal diameter of the bushing 25 to eliminate friction and hanging up in the event bushing 25 should be cocked at a slight angle which is not probable. It will be understood that the cope flask 12 is moving from the dotted line position of FIGURE 7 down to the full line position thereof, the pin having been arrested in downward descent by the shoulder 35 engaging the upper end of the pin 28. As the bushing 25 continues down it arrives about the upper conic section 29 and in passing over this downwardly and outwardly flaring conic section 29 the bushing 25 and cope flask 12 begin to shift to properly locate over the external surface of the larger cylindrical section 31. Once properly located and oriented about larger cylindrical surface 31, the cope flask 12 and its bushing 25 continues downward accurately fitting the lower end of the bushing 25 over the external wall of the drag flask pin 28.

In other words, the smaller cylindrical section 32 having already entered the drag flask pin 28, the locating pin 21 has been oriented and stabilized, then when the bushing 25 slides downwardly over the larger cylindrical section 31 perfect alinement of the bushing 25 with the drag flask pin 28 having previously been assured, the movement of the bushing 25 downwardly over the drag flask pin 28 is accurately achieved.

It will be seen from FIGURE 7 that the bushing 25 continues downward until the two flask parting surfaces kiss at the parting line. All motion thereupon stops. Then hooks 11 on hook frame 10 are opened. Fixture is then lifted back into the air and at the same time the locating pins 21 are stripped away leaving cope and drag flasks in assembled molding position.

The rounded nose 34 and the downwardly tapering cone 33 are provided for easy initial location and engagement into the internal diameter of the drag flask pin 28. The downwardly tapering diameter 30 is to prevent hang-up when pin 21 is to be restricted. The smaller cylindrical section 32 is for locating the pin 21 into the internal diameter of the drag flask pin 28.

Figure 3:
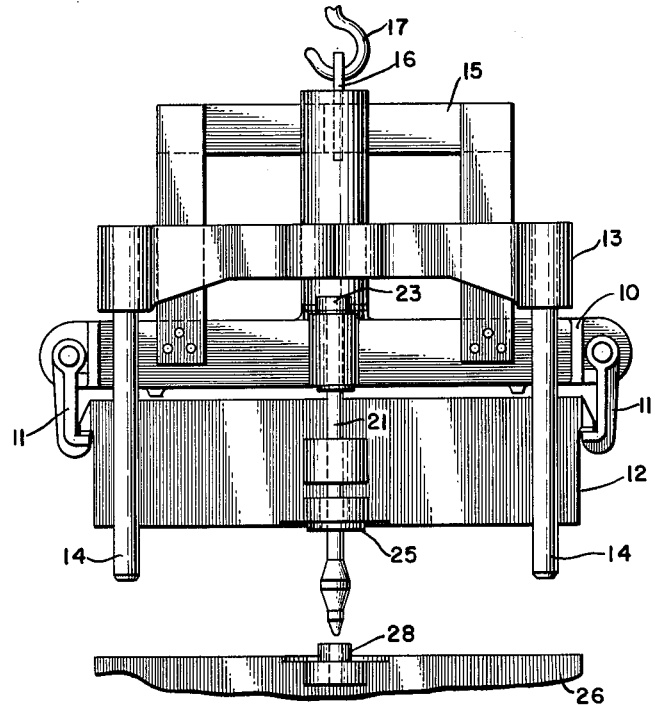
FIGURE 3 is an end view showing the device carrying the cope flask poised above the drag flask in a lowering assembling operation.

Referring to FIGURE 3 which is the suspended position of the fixture with the hooks 11 in place carrying the cope flask 12 and the guide frame 13 in the lowered position on the bail 15. The lower ends of the leveling shafts extend in advance downwardly of the cope flask 12 and the locating pins 21 are shown with their lower ends dependent a substantial distance below the lower ends of the leveling shafts 14. In this position the heads 23 of the pins 21 rest upon upper portions of the hook frame or suitable bushings 36 in the upper portions of the openings 22 in the hook frame in which the pins 21 vertically slide. In other words, the heads 23 of the pins 21 prevent the pins from dropping through the openings 22 and insure the carrying of the lower ends of the pins 21 at the proper distance below the lower ends of the leveling shafts 14.

Figure 4:
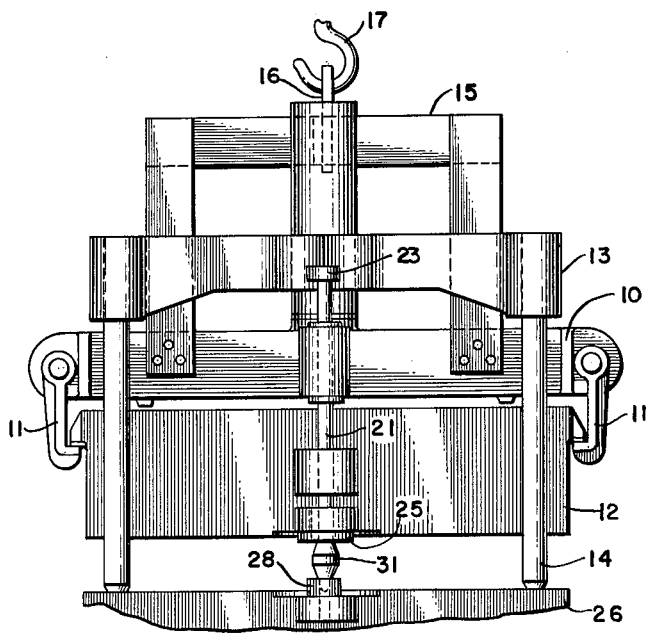
FIGURE 4 is a similar view showing the parts in further lowered position.
Figure 5:
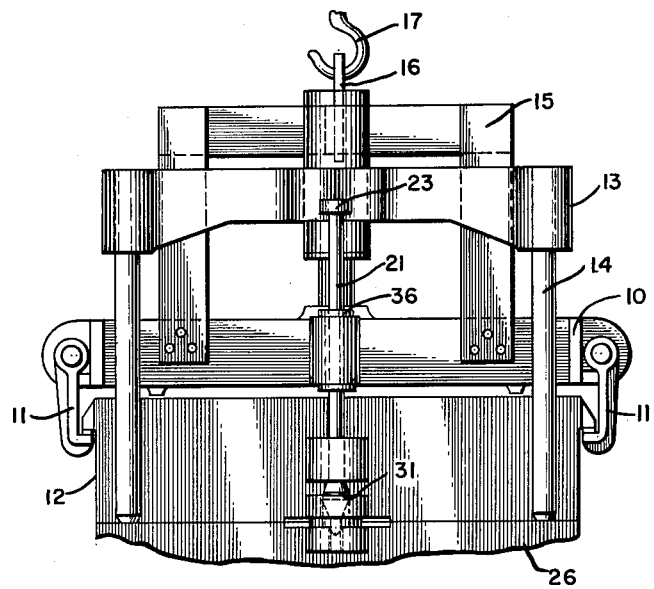
FIGURE 5 is a view similar to FIGURES 3 and 4 with the flasks assembled.

It will be seen from a comparison of FIGURES 3 and 4 that the lower ends of the locating pins 21 will enter the hollow drag flask pins 28 and become located, as shown in FIGURE 7, before the lower ends of the leveling shafts 14 engage the upper surfaces of the drag flask 26.

When the pins 21 become stopped in descent owing to engagement of their shoulders 35 with the upper ends of the drag flask pins 28, the fixture will continue to lower, the hook frame sliding downwardly upon the now fixed locating pins 21, the bushings 36 moving away from the pin heads 23, as shown in FIGURE 2. The pins 21 thus guide the further downward movement of the cope flask 12 in a properly oriented position over the drag flask 26. In this further lowering movement, when the lower ends of the leveling shafts 14 engage the upper surfaces of the drag flask 26, the guide frame 13 will be arrested in downward movement while the bail 15 and the hook frame 10 continue to descend, guided by the locating pins 21. In this operation the leveling shafts 14 will function to create an accurately parallel relation between the lower end of the cope flask 12 and the upper surface of the drag flask 26.

While it is understood that in the art the bushing in the drag flask is called a pin or a hollow drag flask pin, for convenience of expression in the claims this pin has been denominated a bushing along with the similar co-operating bushing of the cope flask. This terminology in the claims is also convenient to avoid conflict with the term locating pin.

It will be noted that the lower drag flask 26 is fixed in position and that accordingly the lower bushing 28 is a fixed bushing while the companion or complemental bushing 25, carried by the cope flask 12, is a movable bushing incident to the fact that the cope flask 12 is carried by a support means by which it is lowered onto the drag flask 26 and following the molding operation, is lifted or raised upwardly to a suspended position, as indicated in FIGURE 3. As shown in this figure the lower end of the locating pin or pins 21 project below the lower ends of the leveling shafts 14 so that the leading end of the pin 21 will enter the lower bushing 28 and become fixed against further movement before the lower ends of the leveling shafts 14 contact the upper surface of the drag flask 26.

The part of the pin 21 designated by the numeral 33 is in effect a pilot part guiding the cylindrical section 32 into accurate position to enter the internal diameter of the lower bushing 28, as shown in FIGURE 7. Also the part 29 of the pin 21 is a pilot section guiding the upper bushing 25 down to a position where it will be received over the larger upper cylindrical section 31 of the pin, thus placing the upper bushing 25 in accurate register with the lower bushing 28 whereby the upper bushing 25 may move down to a telescopic position with respect to the lower bushing 28, the upper bushing extending circumferentially around the lower bushing through sufficient axial length to assure proper registration of the mold cavity.

In the elevating movement of the cope flask 12, its bushing 25 will move upwardly over the pilot part 30 of the pin 21 thus guiding the bushing 25 to and past the upper cylindrical section 31 of the pin.

The telescoped position of the bushings, as shown in FIGURE 7, prevents any lateral movement of the cope flask 12 relatively to the fixed drag flask 26 and the locating pin 21 is constructed and arranged to in the first instance stabilize itself against any lateral movement by its snug telescoped engagement with the lower fixed bushing 28 and it thereafter becomes an accurate guide for the upper bushing 25 and cope flask 12 in its descending movement upon the arrested pin 21 and the companion drag flask 26.

Although I have disclosed herein the best form of the invention known to me at this time, I reserve the right to all such modifications and changes as may come within the scope of the following claims.

What is claimed is:

1. In a molding machine, a fixed drag flask, a cope flask, movable support means for lowering and raising the cope flask, a lower bushing affixed to the fixed drag flask, an upper bushing affixed to the cope flask and adapted to snugly telescope with the lower bushing to resist lateral movement of the cope flask relatively to the drag flask, and locating means pendant from the support means on which the upper bushing is slidable incident to lowering and raising movements of the cope flask, said locating means having a lower leading end suspended beneath the upper bushing in the raised position of the cope flask for slidably internally entering the bushings, said leading end having a lower section for snugly telescoping the lower bushing to stabilize the locating means against lateral movement relatively to the lower bushing and drag flask, and also having stop means for abutting the upper shoulder of the lower bushing to arrest further downward movement of the locating means when the lower section has telescoped the lower bushing, said leading end having an upper section for snugly telescoping the upper bushing incident to the relative descent of the cope flask with respect to the arrested locating means whereby the upper bushing is oriented for telescoping movement circumferentially of the lower bushing and the cope flask is oriented moldwise to the drag flask.

2. A molding machine as claimed in claim 1 in which the bushings and the sections of the locating means are substantially cylindrical.

3. A molding machine as claimed in claim 1 in which the locating means has a lower pilot part leading the lower section, and an upper pilot part trailing the upper section.

4. A molding machine as claimed in claim 1 in which the locating means comprises at least one pin slidable through the support means and having a head at its upper portion for preventing the pin dropping through the support means and by which the pin is lifted and supported.

5. A molding machine as claimed in claim 3 in which the locating means additionally has an intermediate pilot part leading the upper section.

6. A molding machine as claimed in claim 4 in which the stop means comprises a shoulder on the pin.

7. A molding machine as claimed in claim 1 in which the external diameter of the lower bushing is only slightly smaller than the internal diameter of the upper bushing within which it snugly fits, the outside diameter of the lower section snugly fitting the internal diameter of the lower bushing, and the outside diameter of the upper bushing snugly fitting the inside diameter of the upper bushing.

8. A molding machine as claimed in claim 1 further comprising leveling means slidably carried by the support means including shafts having lower leading ends pendant below the cope flask but above the leading end of the locating means.

References Cited in the file of this patent

UNITED STATES PATENTS

| | | |
|---|---|---|
| 475,088 | Montgomery | May 17, 1892 |
| 745,649 | McWane | Dec. 1, 1903 |